United States Patent [19]

Koike

[11] Patent Number: 4,830,309

[45] Date of Patent: May 16, 1989

[54] RETRACTOR PERMITTING FORCIBLE LOCK RELEASE

[75] Inventor: Kiyokazu Koike, Fujisawa, Japan

[73] Assignee: Nippon Seiko Kabushiki Kaisha, Shinagawa, Japan

[21] Appl. No.: 112,512

[22] Filed: Oct. 26, 1987

[30] Foreign Application Priority Data

Oct. 25, 1986 [JP] Japan .................. 61-252827

[51] Int. Cl.$^4$ .................. B60R 22/38; B60R 22/40
[52] U.S. Cl. .................. 242/107.4 A; 242/107.4 B
[58] Field of Search ............. 242/107.4 A, 107.4 B; 280/806; 297/478

[56] References Cited

U.S. PATENT DOCUMENTS

| | | | |
|---|---|---|---|
| 4,218,033 | 8/1980 | Finn et al. | 242/107.4 A |
| 4,244,600 | 1/1981 | Takada | 242/107.4 A X |
| 4,265,415 | 5/1981 | Harrell et al. | 242/107.4 A |
| 4,273,301 | 6/1981 | Frankila | 242/107.4 A |
| 4,277,037 | 7/1981 | Loose et al. | 242/107.4 A |
| 4,304,373 | 12/1981 | Nishimura | 242/107.4 A |
| 4,327,883 | 5/1982 | Yamamoto | 242/107.4 A |
| 4,344,588 | 8/1982 | Hollowell et al. | 242/107.4 A |

FOREIGN PATENT DOCUMENTS 58-10669 2/1983 Japan .
61-171656 10/1986 Japan .
2073578 10/1981 United Kingdom ........ 242/107.4 A Primary Examiner—John M. Jillions
Attorney, Agent, or Firm—Wegner & Bretschneider

[57] ABSTRACT

A retractor permitting a forcible lock release is provided. It is constructed of a base, a retractor shaft, a latch plate and ratchet wheel fixed on the shaft, a lock plate loose-fit on the shaft, a sensor arm supported on the lock plate, a pawl connected to the lock plate displaceably between a lock position where the pawl prevents rotation of the latch plate in a webbing releasing direction and a non-lock position where the pawl permits free rotation of the latch plate, and a lock releasing device. The sensor arm is displaceable between an engagement position where the sensor arm engages the ratchet wheel and a non-engagement position where the sensor arm is maintained out of engagement from the ratchet wheel. The pawl is brought to the lock position when the sensor arm is at the engagement position and the lock plate is turned in the webbing releasing direction. When operated, the lock releasing device develops a pahse difference in the webbing winding rotational direction between the ratchet wheel and sensor arm and then causes the lock plate to turn forcibly in the webbing winding direction.

15 Claims, 11 Drawing Sheets

RETRACTOR PERMITTING FORCIBLE LOCK RELEASE

BACKGROUND OF THE INVENTION (1) Field of the Invention

This invention relates to a retractor for controlling the winding and release of a webbing in a seat belt system for restraining an occupant in a seat of a vehicle such as automobile, and more specifically to a retractor permitting a forcible release of a webbing from a locked state in the event of an emergency such as over-turn of a vehicle.

(2) Description of the Prior Art

A retractor suitable for use, e.g., in a so-called passive belt system which does not include any buckle has been conventionally constructed in such a way that an associated webbing can be forcibly released from its locked state, because if the webbing remains in its locked state in the event of an emergency such as over-turn of a vehicle, the occupant is held continuously in the seat and cannot evacuate the vehicle immediately when the fuel of the vehicle has caught fire, and this is certainly dangerous. On the other hand, it is also important that the occupant can be restrained in the seat to avoid collision against the front glass when the vehicle is stopped abruptly and can also be held surely in the seat to prevent him from being thrown out from the vehicle when the vehicle rolls over. It is hence required to construct the retractor in such a way that the webbing is held surely in a locked state to hold the occupant in the seat in the even of an emergency.

When the vehicle has rolled over on the other hand, it is critical that the occupant is allowed to evacuate the vehicle as quickly as possible. For this purpose, it is also necessary to construct the retractor in such a way that the occupant can easily and surely release the webbing from its locked state. This requirement is contradictory with the above-mentioned requirement that the webbing should be locked as quickly as possible. Although a variety of retractors which permit a forcible release of a locked state have been proposed to date, none of such conventional retractors is believed to satisfy these contradictory requirements fully and many of them are suspicious in their sureness in operation with respect to forcible release of their locked states.

SUMMARY OF THE INVENTION

With the foregoing in view, the present invention has as a principal object the provision of a retractor which is free of such drawbacks of the prior art as mentioned above, is sure in operation and has a high degree of reliability.

In one aspect of this invention, there is thus provided a retractor permitting a forcible lock release, which comprises:

a base;

a retractor shaft supported rotatably on the base and biased in a webbing winding direction;

a latch plate and ratchet wheel fixed on the shaft;

a lock plate loose-fit on the shaft;

a sensor arm supported on the lock plate, said sensor arm being displaceable between an engagement position where the sensor arm engages the ratchet wheel and a non-engagement position where the sensor arm is maintained out of engagement from the ratchet wheel;

a pawl connected to the lock plate displaceably between a lock position where the pawl prevents rotation of the latch plate in a webbing releasing direction and a non-lock position where the pawl permits free rotation of the latch plate, said pawl being brought to the lock position when the sensor arm is at the engagement position and the lock plate is turned in the webbing releasing direction; and a lock releasing means for developing a phase difference in the webbing winding rotational direction between the ratchet wheel and sensor arm and then causing the lock plate to turn forcibly in the webbing winding direction, when operated.

In another aspect of this invention, there is also provided a retractor permitting a forcible lock release, which comprises:

a base;

a retractor shaft supported rotatably on the base and biased in a webbing winding direction;

a latch plate and ratchet wheel fixed on the shaft;

a lock plate loose-fit on the shaft;

a sensor arm supported on the lock plate, said sensor arm being displaceable between an engagement position where the sensor arm engages the ratchet wheel and a non-engagement position where the sensor arm is maintained out of engagement from the ratchet wheel;

a pawl connected to the lock plate displaceably between a lock position where the pawl prevents rotation of the latch plate in a webbing releasing direction and a non-lock position where the pawl permits free rotation of the latch plate, said pawl being brought to the lock position when the sensor arm is at the engagement position and the lock plate is turned in the webbing releasing direction;

a first means for engaging the latch plate to cause the latch plate to turn in the webbing winding direction, when operated;

a second means for contacting the sensor arm to develop a phase difference between the ratchet wheel and sensor arm while the latch plate is being turned by the first means; and a third means for engaging the lock plate subsequent to the development of the phase difference, so that a further rotation of the retractor shaft causes the lock plate to turn in the webbing winding direction.

In a further aspect of this invention, there is also provided a retractor permitting a forcible lock release, which comprises:

a pair of bases;

a pair of retractor shafts supported rotatably on the respective bases and biased respectively in webbing winding directions;

a pair of latch plates fixed on the respective shafts;

a pair of lock means displaceable between locking states where the lock means prevent rotations of the respective latch plates in webbing releasing directions and non-locking states where the lock means permit free rotations of the corresponding latch plates; and a lock releasing means for simultaneously operating the pair of lock means upon an operation of the lock release means whereby the lock means are guided respectively from the locking states into the non-locking states, said lock releasing means comprising a manually operable lever supported turnably on at least one of the bases, a first release means operable by the lever to release one of the lock means, said first releasing means including an engagement portion at which the first releasing means undergoes an engagement with the lever, and a second releasing means engageable with the engagement portion to release the other lock means.

In a still further aspect of this invention, there is also provided a retractor permitting a forcible lock release, which comprises:

a base;

a retractor shaft supported rotatably on the base and biased in a webbing winding direction;

a main ratchet wheel and auxiliary ratchet wheel, both, fixed on the shaft;

a pawl displaceable between a lock position where the pawl prevents rotation of the main ratchet wheel in a webbing releasing direction and a non-lock position where the pawl permits free rotation of the main ratchet wheel;

a means displaceable between a first state in which the displaceable means is connected at a connecting portion thereof to the auxiliary ratchet wheel and a second state in which the displaceable means is not connected to the auxiliary ratchet wheel, said displaceable means serving to guide the pawl to the lock position when the displaceable means is in the first state and the auxiliary ratchet wheel is turned in the webbing releasing direction; and a lock releasing means for developing a phase difference in the webbing winding rotational direction between the main ratchet wheel and displaceable means and then causing the connecting portion of the displaceable means to move forcibly on a webbing winding rotational side of the auxiliary ratchet wheel, when operated.

The retractor according to each aspect of the present invention can lock the webbing surely to ensure the restraint of an occupant in the vehicle seat in the event of an emergency and easily and surely permits a forcible release of the webbing from the locked state thereof.

BRIEF DESCRIPTION OF THE DRAWINGS AND PREFERRED EMBODIMENTS

The above and other objects, features and advantages of the present invention will become apparent from the following description and the appended claims, taken in conjunction with the accompanying drawings, in which:

Figure 8:
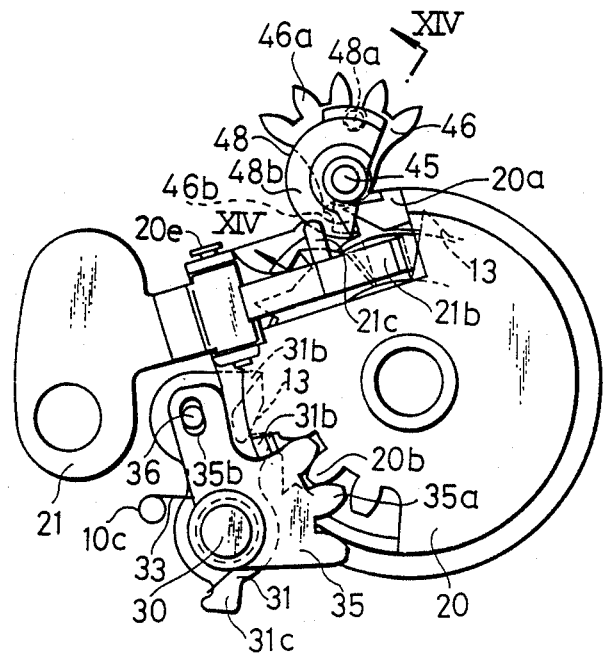
Figure 13:
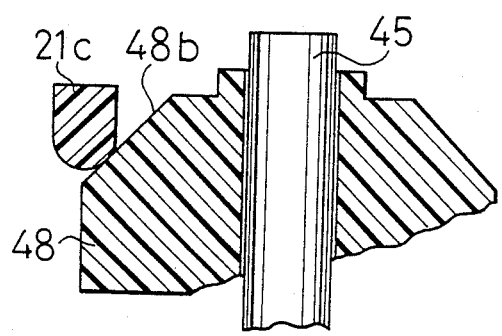
Figure 14:
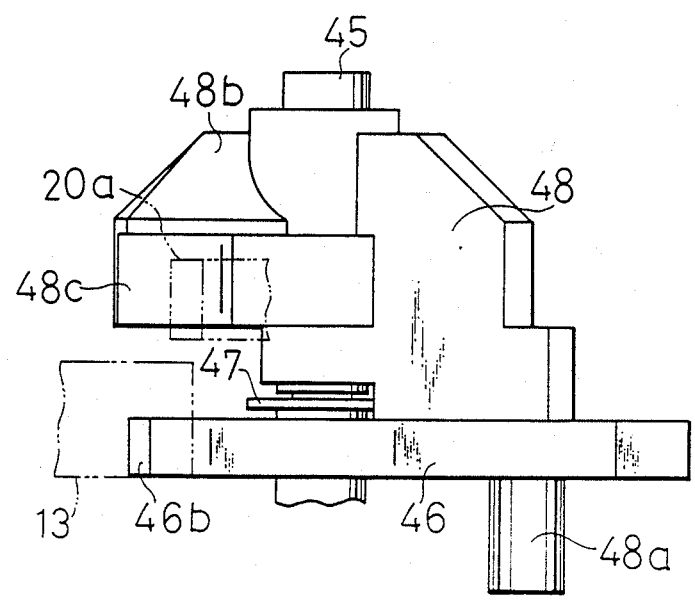
Figure 15:
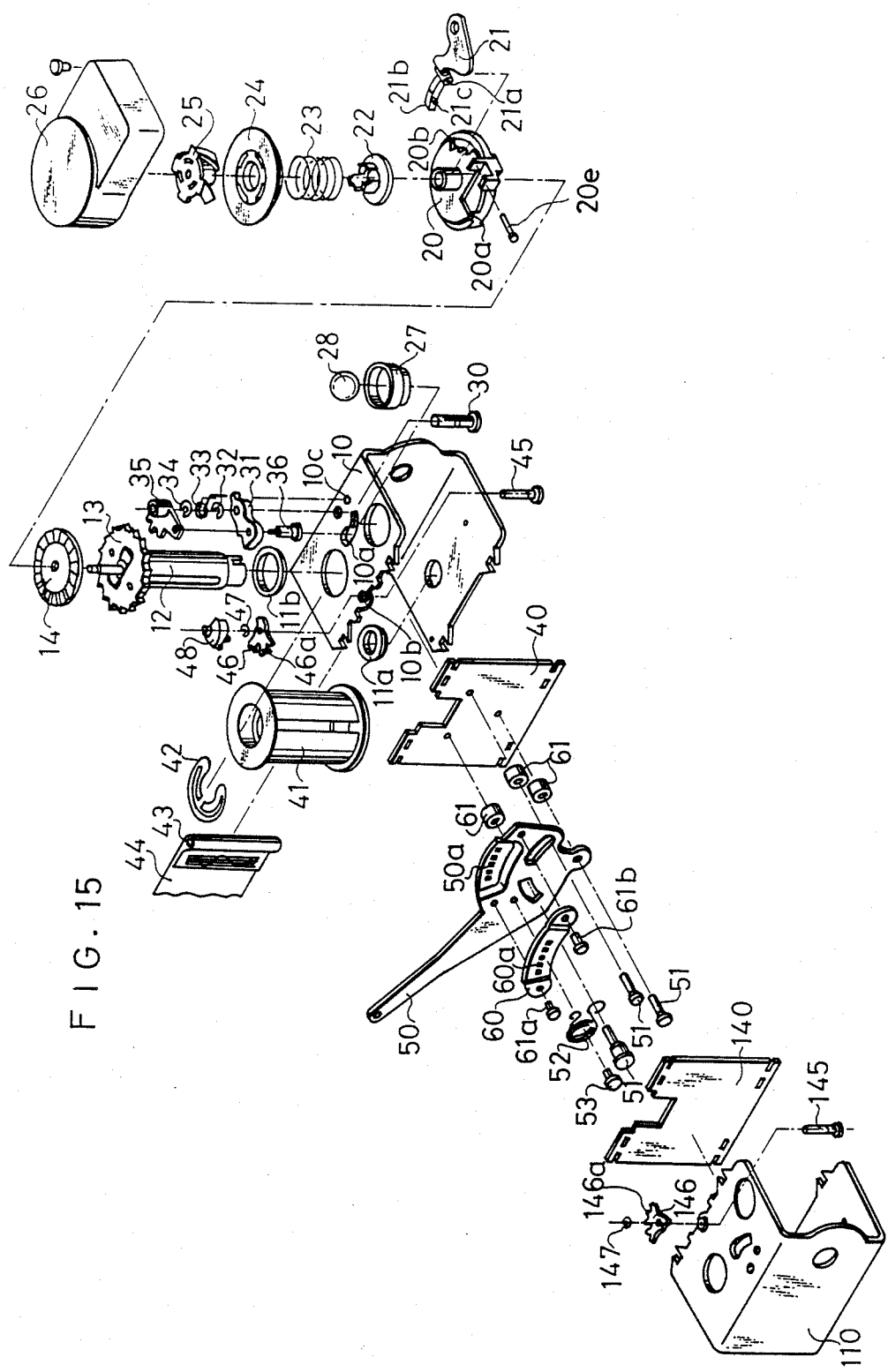
Figure 16:
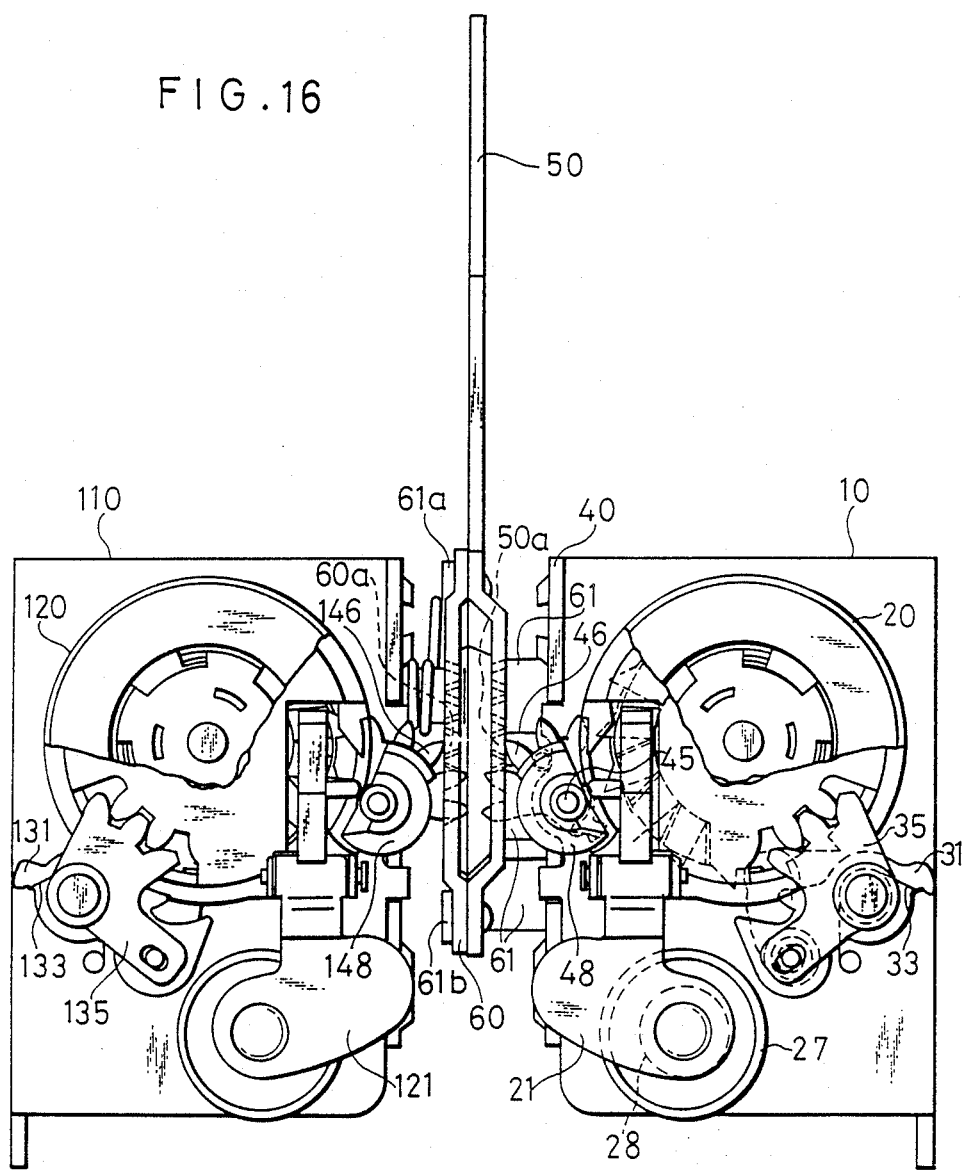

FIG. 13 is a schematic illustration showing the relation between a finger 21c of a sensor arm 21 and a first cam 48b of the release plate 48;

FIG. 14 is a schematic illustration depicting the vertical positional relation among related elements of structure taken along line XIV—XIV in FIG. 8;

FIG. 15 is an exploded perspective view of a double-type retractor according to a second embodiment of this invention;

FIG. 16 is a partly cut-away plan view of the double-type retractor; and

Figure 17:
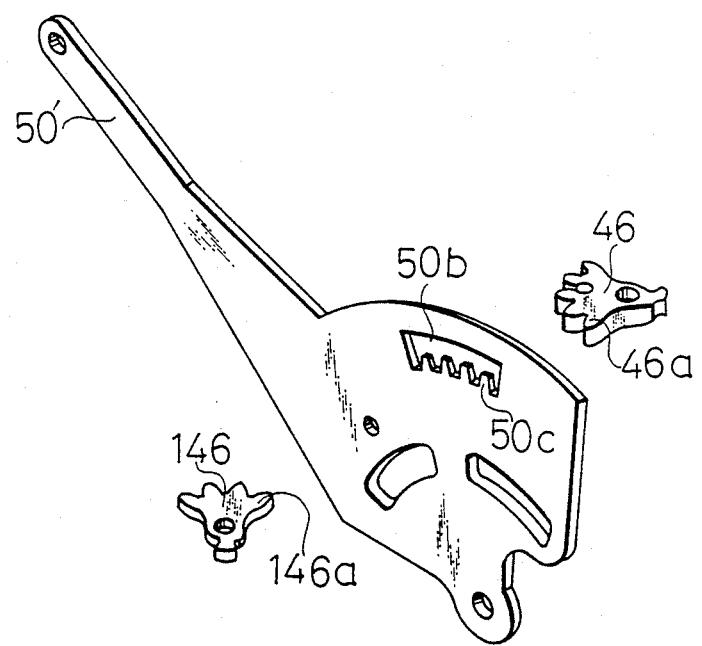

FIG. 17 is a schematic illustration showing a modification of the double-type retractor.

DETAILED DESCRIPTION OF THE INVENTION AND PREFERRED EMBODIMENTS

Figure 1:
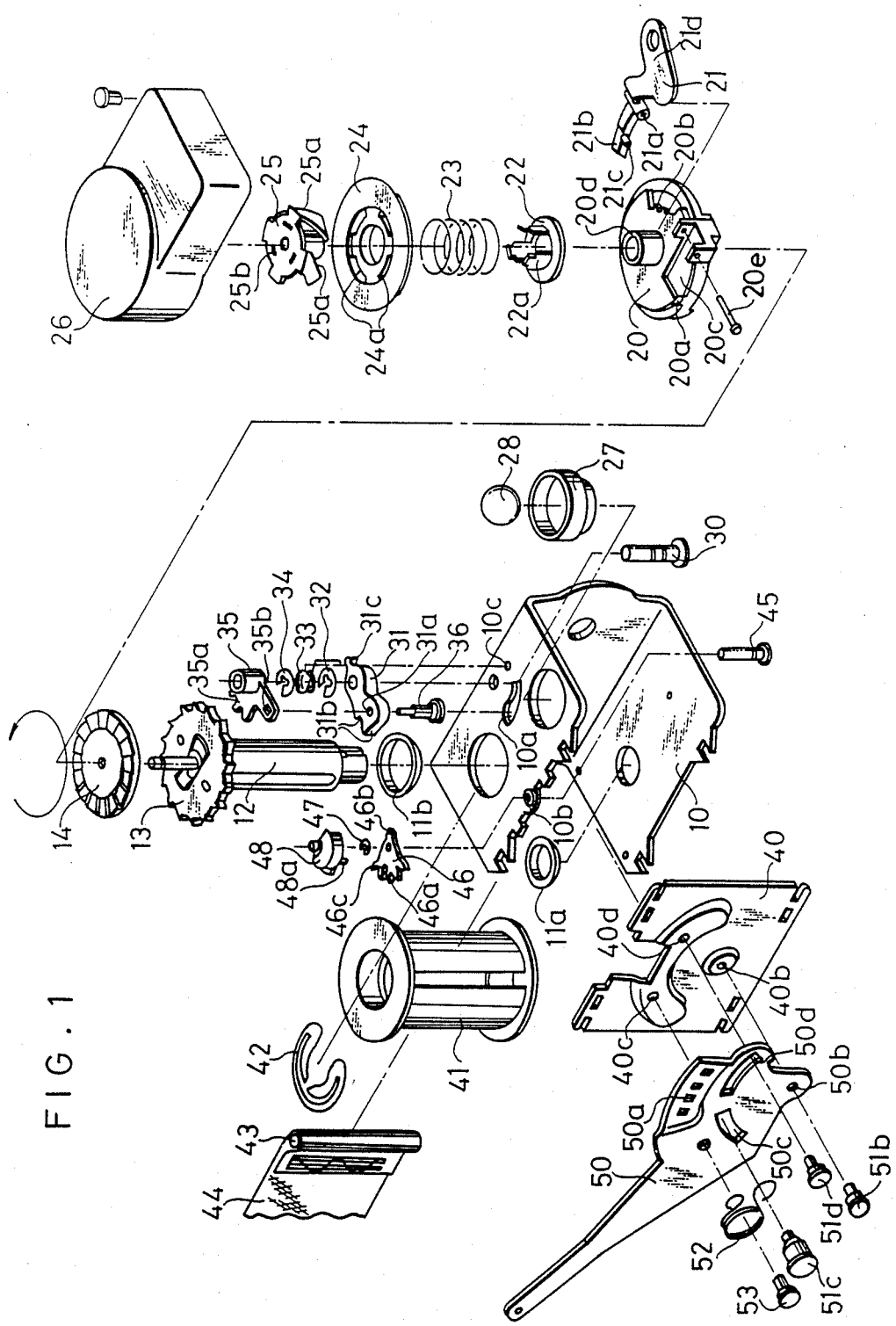
FIG. 1 is an exploded perspective view of a retractor according to a first embodiment of this invention.

Referring first to FIG. 1, the retractor according to the first embodiment of this invention has a retractor base 10 formed into a substantially U shape. Various holes, slots and notches are formed in the retractor base 10 so that necessary parts can be attached to the retractor base 10. A retractor shaft 12 is supported rotatably on the retractor base 10 by way of bushes 11a,11b provided in a pair. The retractor shaft 12 is biased by a take-up spring (not shown), which is arranged on the lower side of the retractor base 10, so that the retractor shaft 12 is caused to rotate in a predetermined winding direction normally. In the illustrated embodiment, the retractor shaft 12 is biased to rotate clockwise normally. Fitted on the retractor shaft 12 is a bobbin 41 whose position is fixed by an E-clip. A webbing 44 terminates inwardly in a pin 43 fixed inside the bobbin 41, whereby the webbing 4 is taken up and stored on the bobbin 41.

A latch plate 13 is provided fixedly on the retractor shaft 12. Latch teeth are formed in the circumference of the latch plate 13. A ratchet wheel 14 is also provided in a state fixed on the latch plate 13. Ratchet teeth are formed in the upper surface of the ratchet wheel 14 along the periphery thereof. A lock plate 20 is loose-fit on the retractor shaft 12. This lock plate 20 is arranged adjacent the ratchet wheel 14. The lock plate 20 is provided with a lock plate cam 20a which extends out in an axial direction from a part of a peripheral end portion of the lock plate 20. Interlocking teeth 20b are formed in the lock plate 20 over a predetermined angular range. A portion of the lock plate 20 is cut off so that a cut-off portion 20c is formed there.

The sensor arm 21 is supported pivotally on the lock plate 20 with a pin 20e extending through a through-hole 21a of the sensor arm 21. The sensor arm 21 is therefore mounted turnably on the lock plate 20 and a tip portion 21b of the sensor arm 21 can engage one of the above-mentioned ratchet teeth of the ratchet wheel 14 by way of the cut-off portion 20c formed in the lock plate 20. The finger 21c is provided on the sensor arm 21 at a suitable location in such a way that the finger 21c protrudes laterally at a substantially right angle relative to the length of the sensor arm 21. It is preferable to form the lower surface of the finger 21 into a hemispherical shape.

The lock plate 20 defines a bush portion 20d which extends in the axial direction. A retainer flange 22 is loose-fit on the bush portion 20d. The retainer flange 22 includes three leg portions 22a extending in the axial direction an formed at equal angular intervals. End portions of these three leg portions 22a are inserted and fixed in their corresponding attachment slits 25b formed in a flange 25 which will be described subsequently, whereby the retainer flange 22 and flange 25 are united together. Further, a sensor coil spring 23 and inertia block 24 are interposed between the retainer flange 22 and flange 25, and the inertia block 24 is maintained in a state biased normally by the coil spring 23 against the flange 25. The flange 25 is provided with four leg portions which extend obliquely relative to the axial direction. One side of each leg portion is formed into an oblique edge. These leg portions are inserted into their corresponding ones of four arcuate slots 24a formed in an angular direction through the inertia block 24. As will be described subsequently, the inertia block 24 causes the sensor arm to turn into engagement with the ratchet wheel 14 when the webbing 44 is pulled out abruptly at an acceleration rate of at least a predetermined value, in other words, performs a so-called webbing sensing function. Incidentally, the flange 25 is provided fixedly on the retractor shaft 12. A sensor cover 26 is fixed on one side of the retractor base 10 and encloses such various sensing elements as mentioned above.

A sensor case 27 is also provided on the retractor base 10. As best shown in a cross-section in FIG. 3, the sensor case 27 has an approximately bowl-shaped inner wall 27a and is provided with a ball weight 28 received therein. By the way, a base portion 21d of the sensor arm 21 is formed with a width sufficient to cover the sensor case 27 substantially. Accordingly, the ball weight 28 is prevented from dropping out of the sensor case 27. As will be described subsequently, the ball weight 28 serves as a sensing element in the case of so-called vehicle body sensing. When the vehicle body takes an abnormal position, e.g. by rolling over, the ball weight 28 tends to roll out of the sensor case 27 so that the ball weight 28 causes the sensor arm 21 to turn about the pin 20e so as to bring the tip portion 21b into engagement with the ratchet wheel 14.

A pawl pin 30 is also provided through the retractor base 10. A pawl 31, pawl spring 33 and lock arm 35 are all fitted on the pawl pin 30. Further, E-clips 32,34 are fit respectively in grooves formed in the pawl pin 30 so as to position the pawl 31 and lock arm 35 at predetermined locations respectively. The pawl 31 is provided turnably about the pawl pin 30. A pair of pawl edges 31b,31b are formed in an end portion of the pawl 31 at a predetermined interval therebetween and a connecting hole 31a is also formed through the pawl 31. These pawl edges 31b,31b are engageable with the latch teeth of the latch plate 13 as will be described subsequently. The pawl 31 also defines a tab 31c extending in a direction opposite to the pawl edges 31b,31b. The pawl spring 33 is a coil spring and is fitted on the pawl pin 30. One end of the pawl spring 33 is hooked in a retaining hole 10c formed through the retractor base 10 and the other end is hooked on the tab 31c of the pawl 31. Accordingly, the pawl 31 is normally biased by the pawl spring 33 counterclockwise, namely, in a direction away from the latch plate 13. The lock arm 35 is also provided turnably on the pawl pin 30. A connecting hole 35b is formed through the lock arm 35. A pin 36 is provided extending through the hole 31a of the pawl 31 and the hole 35b of the lock arm 35, whereby the pawl 31 and lock arm 35 are allowed to turn as unitary members about the pawl pin 30. Lock teeth 35a are formed in the lock arm 35 over a predetermined angle range and in an assembled state, these lock teeth 35a are maintained in engagement with the teeth 20b of the lock plate 20. In addition, a guide slot 10a is also formed in an arcuate form over a predetermined angle range through the retractor base 10, in which a pin 36 connecting the pawl 31 and lock arm 35 is loose-fitted. Turning motions of the pawl 31 and lock arm 35 about the pawl pin 30 are therefore limited within an angle range defined by the guide slot 10a.

A bridge 40 is provided as a unitary member over the opening side of the substantially U-shaped retractor base 10. An attachment hole 40b is formed through the bridge 40. A pin 51b extends through an attachment hole 50b formed through the release lever 50 and is fixed in the attachment hole 40b of the bridge 40. Therefore, the release lever 50 is manually turnable about the pin 51b. Further, a pair of holes 40c,40d are also formed at prescribed locations through the bridge 40. On the other hand, a pair of arcuate slots 50c,50d are formed through the release lever 50 at locations corresponding respectively to the paired holes 40c,40d. The pins 51c,51d extend through their corresponding slots 50c,50d and are fixed at their end portions in the holes 40c,40d respectively. Therefore, the turnable angle of the release lever 50 about the pin 51b is limited by the engagement of the pins 51c,51d with the end edges of their corresponding slots 50c,50d. A pin 53 is also provided at a suitable location through the release lever 50, and a coil spring 52 which undergoes a toggle motion extends between the pin 51c and the pin 53. Accordingly, the release lever 50 is normally biased to either one of two positions defined respectively by the end edges of the slots 50c,50d. The release lever 50 also defines a predetermined number of window openings 50a arranged at a predetermined pitch in an arcuate pattern.

A still further hole 10b is also formed through the retractor base 10. A click pin 45 extends out through the hole 10b. The release click 46 is fitted on the click pin 45 and the release plate 48 is also fitted on the click pin 45 with an E-clip 47 interposed as a spacer therebetween. A connecting recess 46c is formed in the release click 46 and a connecting pin 48a of the release plate 48 is loose-fitted in the connecting recess 46c. Accordingly, the release click 46 and release plate 48 are united together with respect to their turning motions about the click pin 45. The release click 46 defines the desired number of teeth 46a, which are maintained in engagement with the window openings 50a formed through the release lever 50 in an assembled state. When the release lever 50 is turned manually, the release click 46 is hence caused to turn about the click pin 45 by way of the engagement between the window openings 50a and the teeth 46a. The release click 46 also defines a click tooth 46b on a side opposite to the teeth 46a. As will be described subsequently, the click tooth 46b is engageable with the latch teeth of the latch plate 13 so that the latch plate 13 can be turned in the webbing winding direction. Accordingly, a release mechanism is constructed basically by the release lever 50, release click 46 and release plate 48.

Figure 2:
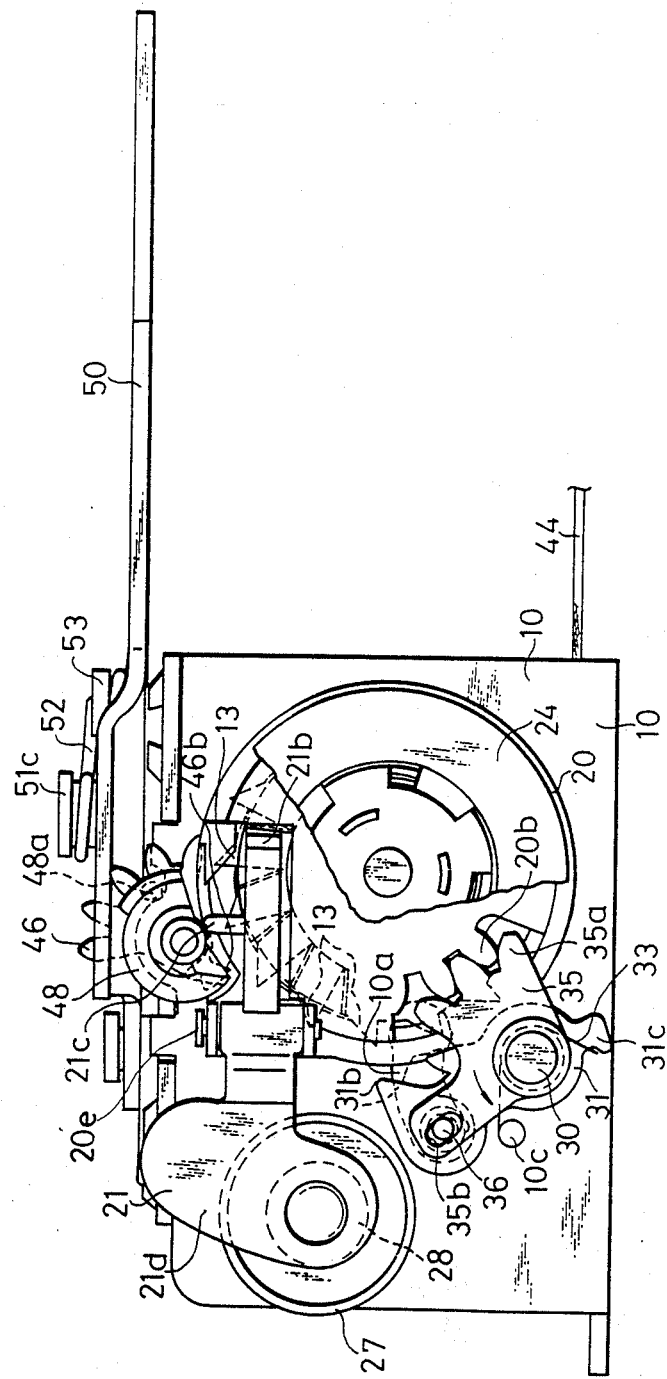
FIG. 2 is a partly cut-away plan view of the retractor.

In FIG. 2, the retractor is in a non-operated state, namely, neither the sensor mechanism nor the lock mechanism has been operated. In this state, the webbing can be pulled out of the retractor and owing to the winding force of the unillustrated take-up spring, can be taken up into the retractor as desired. Since no locking has taken place, the release mechanism is also in a non-operated state.

As already described above, the lock arm 35 is provided turnably about the pawl pin 30 and its lock teeth 35a are in engagement with the teeth 20b of the lock plate 20. Regarding turning motions, the pawl 31 is united with the lock arm 35 by means of the pin 36. The pawl 31 is normally biased by the spring 33 in a direction indicated by an arrow, whereby the pin 36 assumes a retreated position where the pin 36 is in contact with one of the end edges of the arcuate slot 10a. In this state, the pawl edges 31b,31b of the pawl 31 are separated from the teeth 13 of the latch plate 13. Turning next to the sensor arm 21 supported pivotally on the lock plate 20 by means of the pin 20e, its tip portion 21b is located at a retreated position and is hence separated from ratchet teeth of the other hand, the base portion 21d of the sensor arm 21 covers substantially the opening of the sensor case 27 and the ball weight 28 received in the sensor case 27 is hence allowed to rest in the bottom of the bowl-shaped inner wall 27a of the sensor case 27.

Figure 3:
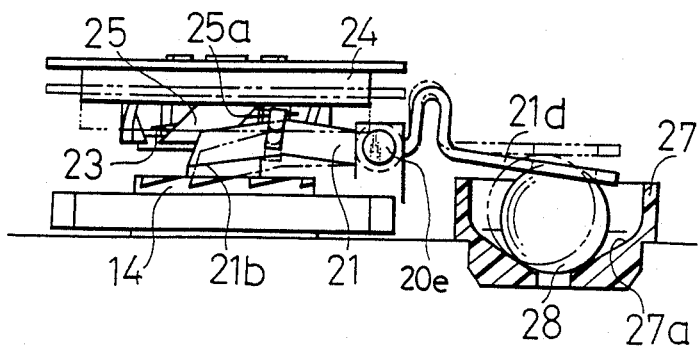
FIG. 3 is a schematic illustration of a sensor mechanism of the retractor.

With reference to FIG. 3, a description will next be made on the sensor mechanism of the retractor in particular. The sensor mechanism shown in FIG. 3 senses an abnormal state by at least one of two methods, one being the webbing sensing method based on an abrupt release of the webbing 44 from the webbing and the other being the vehicle body sensing method based on an abnormal position of a vehicle body. The sensor mechanism causes the sensor arm 21 to turn counterclockwise about the pin 20e so that the tip portion 21b is brought into engagement with one of ratchet teeth of the ratchet wheel 14. Namely, the state shown by solid lines in FIG. 3 indicates that the sensor mechanism has not been operated. In this state, the inertia block 24 is held by the spring 23 at the highest position, namely, at a position where the inertia block 24 comes into contact with a top portion of the flange 25. Since the vehicle body is in a normal position, the sensor case 27 is maintained in a horizontal state and the ball weight 2 received in the sensor case 27 is hence located at the bottom of the sensor case 27. As a consequence, the sensor arm 21 is positioned as indicated by solid lines and its tip portion 21b is separated from any of the ratchet teeth of the ratchet wheel 14.

When an occupant wearing a seat belt system including the retractor of the first embodiment is thrown forward because of an abrupt stop of the vehicle by way of example, and the webbing 44 is accordingly pulled out at an acceleration rate of at least a predetermined value from the retractor, the retractor shaft 12 is caused to rotate abruptly so that the flange 25 fixed on the retractor shaft 12 also rotates suddenly. Since the inertia block 24 has a certain degree of mass, the inertia block 24 does not follow the sudden rotation of the flange 25 and moves downwards along the oblique edges 25a. As a consequence, the inertia block 24 comes into engagement with the sensor arm 21 and causes the sensor arm 21 to turn counterclockwise about the pin 20e to an operated position indicated by two-dot chain lines, whereby its tip portion 21b is brought into engagement with one of the ratchet teeth of the ratchet wheel 14. This is the so-called webbing sensing function.

Even if the webbing is not pulled out abruptly as mentioned above, the retractor is still locked provided that the vehicle body rolls over, falls down or otherwise assumes any abnormal position. Namely, the ball weight 28 received in the sensor case 27 rolls up on the inclined wall of the bowl-shaped inner wall 27 from the bottom toward the opening end thereof. As a result, the sensor arm 21 is caused to turn counterclockwise about the pin 20e so as to assume an operated position indicated by the two-dot chain lines. Accordingly, its tip portion 21b is brought into contact with one of the ratchet teeth of the ratchet wheel 14. This is the so-called vehicle body sensing function.

Figure 4A:
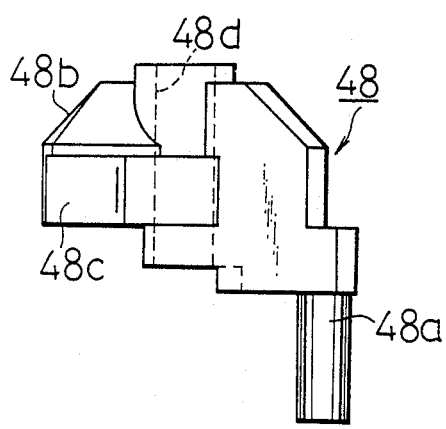
FIGS. 4a through 4c are respectively a front view, plan view and bottom view of a release plate 48 employed in the retractor.
Figure 4B:
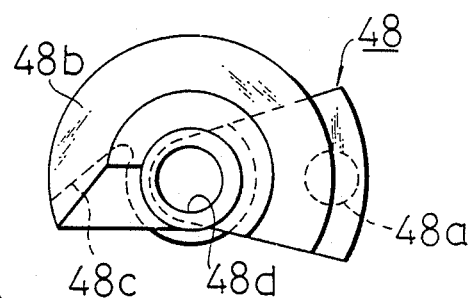
Figure 4C:
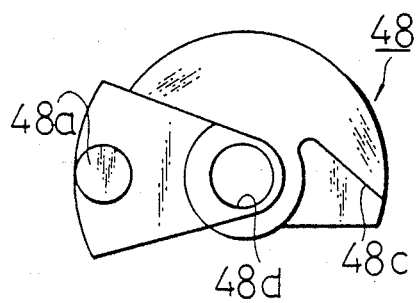

The release mechanism of the retractor according to the first embodiment of this invention will next be described with reference to FIGS. 4a through 4c, 5 and 6. The release mechanism to be described now on is adapted to release surely and promptly the retractor from its locked state by a manual operation when the sensor mechanism has been operated by the webbing sensing or vehicle body sensing method as described above and the lock mechanism, which will be described subsequently, has hence been brought into a locked state (namely, the pawl edges 31b,31b of the pawl 31 have been brought into engagement with the latch teeth of the latch plate 13 and the retractor shaft 12 has been prevented from rotating in the webbing releasing direction). As illustrated in FIGS. 4a through 4c respectively, the release plate 48 centrally defines a through-hole 48d through which the click pin 45 is inserted. The release plate 48 also defines, in a downwardly extending form, the connecting pin 48a which is inserted in the connecting recess 46c formed in the release click 46 depicted in FIG. 5 so as to unify each turning motion of the release plate 48 with that of the release click 46. A first cam 48b in the form of an inclined conical side wall is also formed on the release plate 48. Also formed on the release plate is a second cam 48c which upon engagement with the lock plate cam 20a, causes the lock plate 20 to turn in the releasing direction. The second cam 48c is defined by a vertical wall extending at a certain angle relative to the corresponding radius of the release plate 48 when the release plate 48 is turned in the releasing direction. Incidentally, the first cam 48b serves to engage the finger 21c of the sensor arm 21 so that the sensor arm 21 is brought to its non-operated position indicated by solid lines in FIG. 3. On the other hand, the second cam 48c engages the lock plate cam 20a of the lock plate 20 when the release plate 48 is turned in the releasing direction, so that the lock plate 20 is caused to turn in the releasing direction and responsive to this turning motion of the lock plate 20, the lock arm 35 and pawl 31 are also turned in the releasing direction, and the pawl edges 31b,31b of the pawl are eventually brought to their retreated positions so as to release the engagement between the pawl edges 31b,31b and the latch teeth of the latch plate 13.

Figure 5:
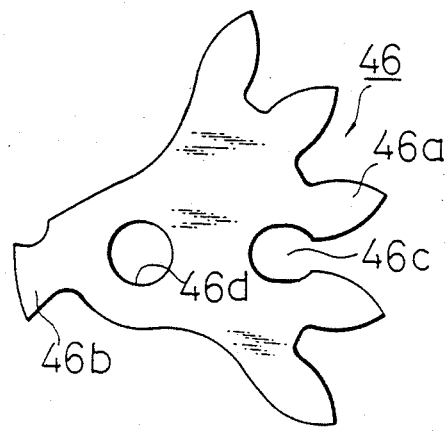
FIG. 5 is a plan view of a release click 46 used in the retractor.
Figure 6:
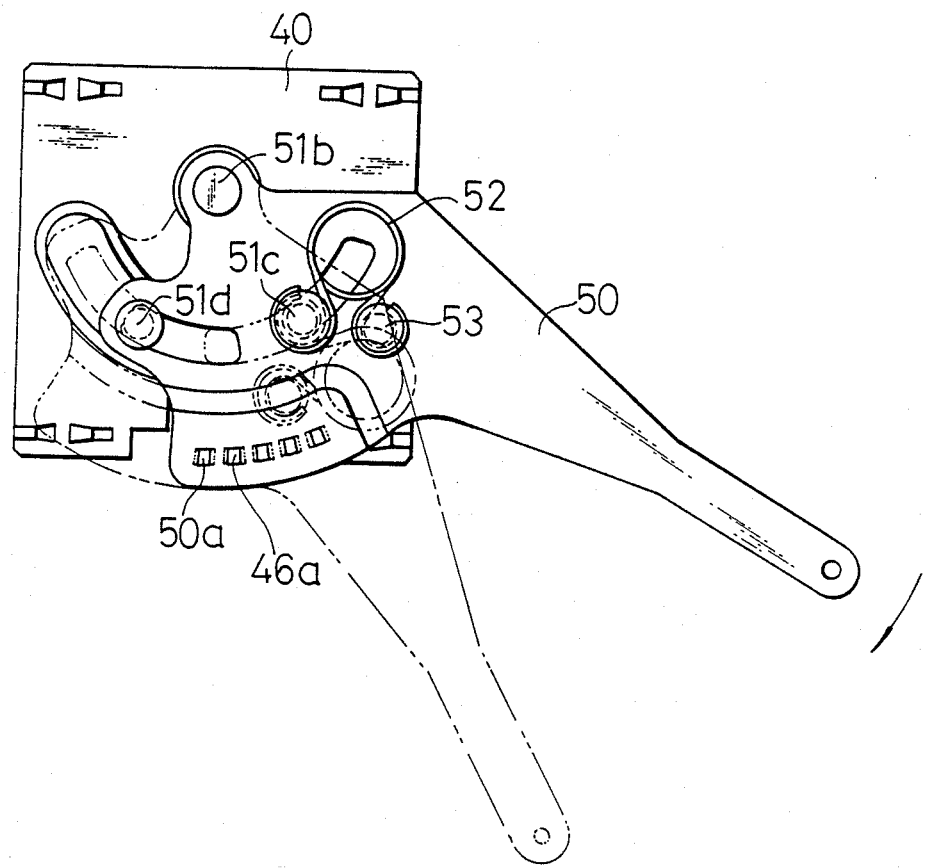
FIG. 6 is a schematic illustration showing the operation of a release lever 50 in the retractor.

The configurations of the release click 46 is illustrated in detail in the plan view of FIG. 5. In the illustrated embodiment, the five teeth 46a are formed at a predetermined pitch in an arcuate pattern. The through-hole 46d is bored, through which the click pin 45 extends. The click tooth 46b is also formed as a projection or tab on the release click 46 on the side opposite to the teeth 46a. When the release click 46 is turned, this click tooth 46b comes into engagement with one of the latch teeth of the latch plate 13 so as to cause the latch plate 13 to turn in the releasing direction, whereby the engagement between the tip portion 21b of the sensor arm 2 and one of the ratchet teeth of the ratchet wheel 14 is released. The teeth 46a of the release click 46 are in engagement with the window openings 50a of the release lever 50 as depicted in FIG. 6, so that the release click 46 is turned about the click pin 45 whenever the release lever 50 is turned. As depicted in FIG. 6, the release lever 50 is biased by the coil spring 52 to either one of the non-operated position indicated by solid lines or the operated (namely, releasing) position indicated by two-dot chain lines.

The operation of the retractor according to the first embodiment of this invention will next be described with reference to FIGS. 7 through 12 in particular.

Figure 7:
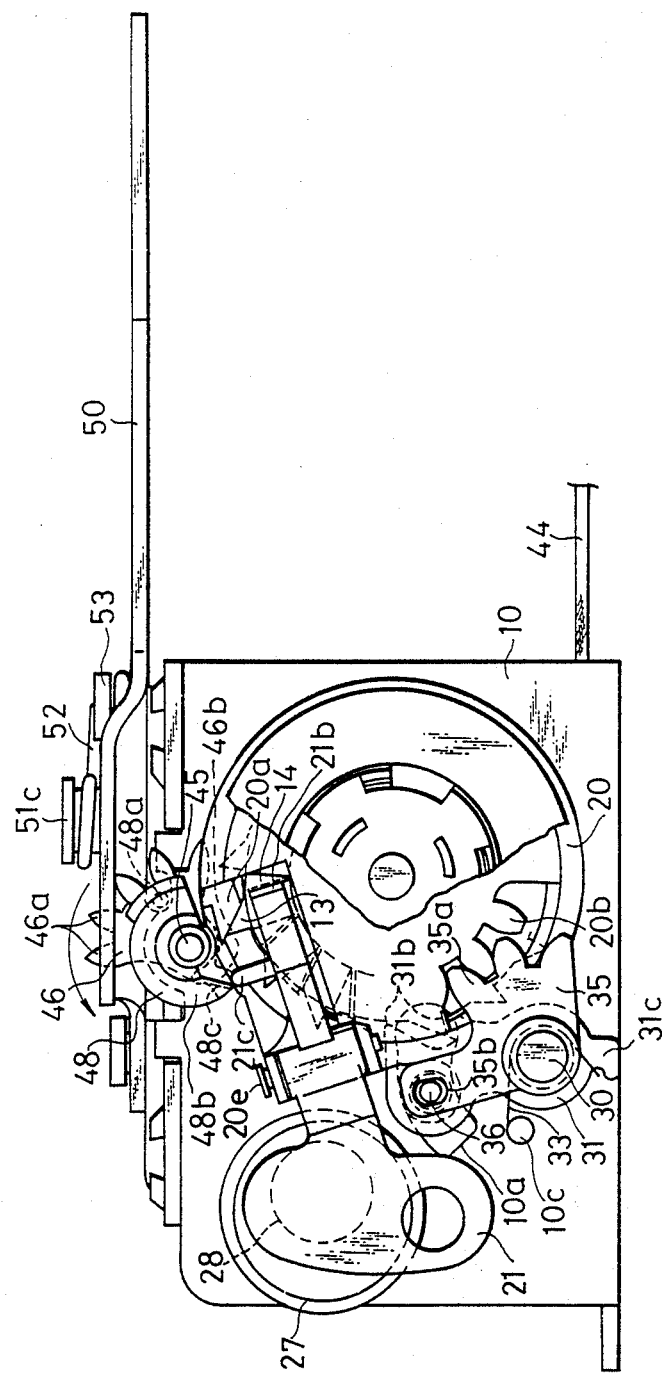
FIGS. 7 through 11 are schematic illustrations depicting the operation of the retractor in various different stages.

FIG. 7 shows the retractor in a state locked by the vehicle body sensing method. Since it is in the locked state, the webbing 44 cannot be pulled out of the retractor. Since this locked state has been established by the vehicle body sensing method, the ball weight 28 has moved toward the opening of the sensor case 27 and as a result, the sensor arm 21 has been turned about the pin 20e. As a consequence, the tip portion 21b of the sensor arm 21 has been brought into engagement with one of the ratchet teeth of the ratchet wheel 14. Since the sensor arm 21 is mounted on the lock plate 20, the lock plate 20 has been turned counterclockwise by a rotation of the ratchet wheel 14 in the webbing releasing direction (i.e., the counterclockwise direction as viewed in FIG. 7). Since the interlocking teeth 20b of the lock plate 20 are in engagement with the lock teeth 35a of the lock arm 35, the lock arm 35, hence, the pawl 31 provided as an unitary element with the lock arm 35 is turned clockwise against the spring force of the pawl spring 33 about the pawl pin 30 by a counterclockwise rotation of the lock plate 20. Eventually, the pawl edges 31b,31b are brought into engagement with the latch teeth of the latch plate 13 so as to inhibit any further rotation of the latch plate 13, hence, the retractor shaft 12 in the webbing releasing direction. FIG. 7 shows that the pawl edges 31b,31b are in engagement with the latch teeth of the latch plate 13 and a locked state has hence been established.

Figure 12:
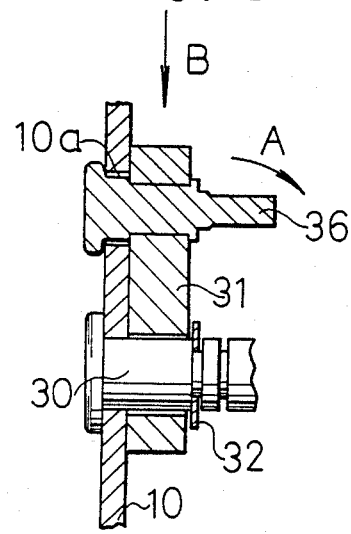
FIG. 12 is a schematic illustration showing the direction of possible displacements of a pawl 31 while the retractor is in a locked state.

In the locked state of FIG. 7, the pin 36 fixed on the pawl 31 extends through the guide slot 10a in the retractor base 10 and its head portion engages the surface of the retractor base 10 (see FIG. 12). Accordingly, the pin 36 also serves as a reinforcement member for preventing the pawl 31 from being displaced in directions A and B upon establishment of the locked state and application of a force to the pawl 31. The locked state shown in FIG. 7 has been established by the vehicle body sensing method as mentioned above. In order to allow the occupant wearing the seat belt system to evacuate the vehicle in the abnormal position, it is essential to release this locked state forcibly. A description will next be made of such a forcible lock releasing operation. First of all, the occupant holds the release lever 50 by his hand and turns it in a direction as shown by an arrow in FIG. 6. Since the release lever 50 and release click 46 are interlocked in operation, the release click 46 is caused to turn counterclockwise about the click pin 45 by the turning displacement of the release lever 50.

In the state shown in FIG. 8, the release click 46 and the release plate 48 integral with the release click 46 have been turned a little counterclockwise. This state occurs immediately before the click teeth 46b of the release click 46 come into contact with the latch teeth of the latch plate 13 to cause the latch plate 13 to turn clockwise. It should be noted that the pawl edges 31b,31b of the pawl 31 has a shape not interfering with clockwise rotation of the latch plate 13. In the state depicted in FIG. 8, the first cam 48b of the release plate 48 is about to contact the finger 21c of the sensor arm 21 and the second cam 48c is not in engagement with the lock plate cam 20a. The vertical positional relation among the release click 46, release plate 48 and their associated latch plate 13 and lock plate cam 20a as viewed in the direction XIV—XIV in FIG. 8 is shown in FIG. 14. Further, the positional relation between the finger 21c of the sensor arm 21 and the first cam 48b of the release plate 48 in this state is depicted in FIG. 13.

Figure 9:
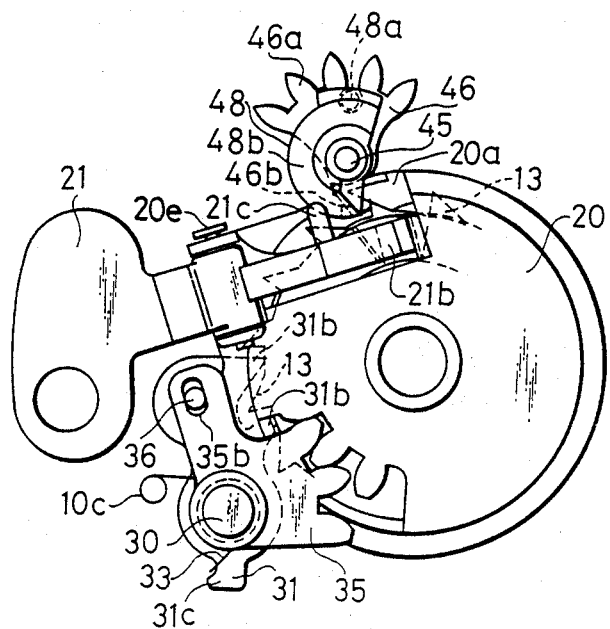

FIG. 9 illustrates a state in which the release click 46 and release plate 48 have been turned further in the counterclockwise direction. In this state, the click tooth 46b has caused only the latch plate 13 and ratchet wheel 14 to turn a little in the clockwise direction. Since the finger 21c of the sensor arm 21 is in contact with the first cam 48b of the release plate 48, the sensor arm 21 cannot follow rotation of the ratchet wheel 14 so that a phase difference occurs in rotational angle between the sensor arm 21 and the ratchet wheel 14. As a result, the tip portion 21b of the sensor arm 21 is out of engagement with any one of the ratchet teeth of the ratchet wheel 14. (Incidentally, the force of the spring 33, which is applied via the pawl 31 and lock upwardly on the inclined surface of the first cam 48b so long as no additional force is applied in combination.) Further, the first cam 48b of the release plate 48 has started causing the finger 21c to displace upwardly but the second cam 48c has not yet been brought into contact with the lock plate cam 20a.

Figure 10:
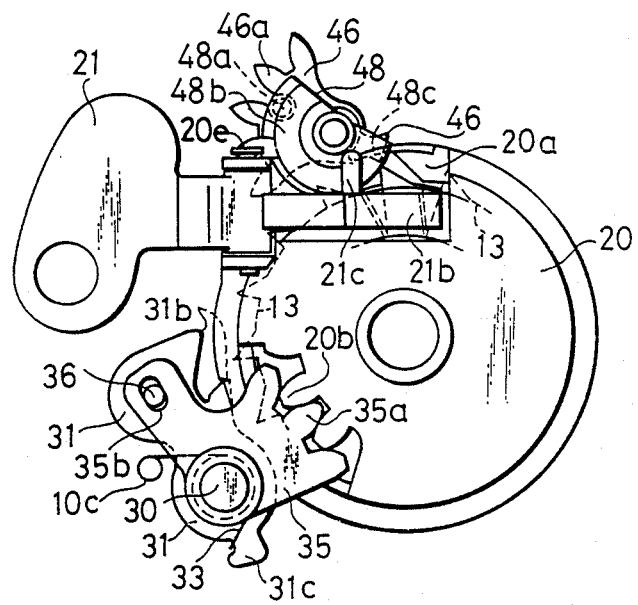

FIG. 10 illustrates a state in which the action of the click tooth 46b of the release click 46 on the latch plate 13 has ended. In this state, the second cam 48c of the release plate 48 has been brought into contact with the lock plate cam 20a so that the lock plate 20 has been caused to turn clockwise. Accordingly, the finger 21c has been lifted upwardly by the inclined surface of the first cam 48b of the release plate 48 so that the sensor arm 21 is at the non-operated position thereof. Owing to a clockwise rotation of the lock plate 20, the lock arm 35 and pawl 31 have been turned counterclockwise about the pawl pin 30 by way of the engagement between the interlocking teeth 20b of the lock plate 20 and the lock teeth 35a of the lock arm 35. Thus, the pawl 31 has been brought to its retreated position and has been disengaged from the latch plate 13. In the illustrated state, the locked state has already been released and the release and winding of the webbing 40 can thus be performed as desired.

Figure 11:
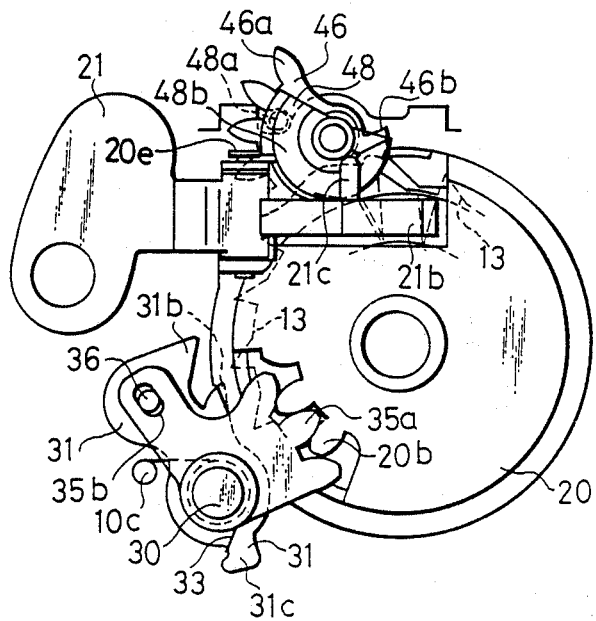

In FIG. 11, the release click 46 and release plate 48 have been caused to turn further in the counterclockwise direction, the click tooth 46b has been separated completely from the latch plate 13, and the initial non-locked state has been restored.

The exploded perspective view of FIG. 15 shows the retractor according to the second embodiment of this invention. Basically, the second embodiment has a structure similar to the structure of the first embodiment described above. Therefore, like elements of structure are identified by like reference numerals. The second embodiment has a double-retractor structure. As is understood from the assembled form shown in FIG. 16, a pair of retractors of the emergency lock type are provided side by side. Arranged between these retractors is the release lever 50 which is adapted to release the retractors from their locked states manually. Incidentally, the right-hand retractor in FIGS. 15 and 16 corresponds to the single-type retractor shown in FIGS. 1 through 14 while the left-hand retractor depicted in FIGS. 15 and 16 has a structure in a mirror-image relation with the right-hand retractor. Accordingly, the individual elements of structure of the left-hand retractor are designated by adding "100" to the reference numerals of their corresponding elements of structure in the right-hand retractor.

In the second embodiment shown in FIGS. 15 and 16, a substantially-arcuate release plate 60 is secured fixedly on the release lever 50 by means of pins 61a,61b. A plurality of window openings 60a are formed at a predetermined pitch through the release plate 60. It is preferable to form these window openings 60a in the same shape and at the same pitch as the window openings 50a of the release lever 50. The release plate 60 is hence integral with the release lever 50 and in an assembled state, the window openings 60a are in engagement with teeth 146a of a release click 146 of the left-hand retractor. In the second embodiment, the paired retractors can be released forcibly and simultaneously from their locked state by manually turning the release lever 50 from its non-operated position to its operated position.

FIG. 17 indicates the modification of the double-type retractor shown in FIGS. 15 and 16. In this modification, a release lever 50' is formed into a flat shape. The substantially-arcuate attachment slot 50b is formed at a part of the release lever 50' and teeth 50c are formed at a predetermined constant pitch along the lower edge of the attachment slot 50b. In an assembled state, the teeth 46a of the release click 46 of the right-hand retractor (not shown) are in a state engaged with the teeth 50c of the release lever 50'. The teeth 46a of the release click 46 are designed to have such a length that the teeth 46a engage the teeth 50c and then protrude in the opposite side of the release lever 50'. On the other hand, the teeth 146a of the release click 146 of the left-hand retractor do not engage the teeth 50c of the release lever 50' directly but engage the teeth 46a of the release click 46. Accordingly, it is preferable to form the release clicks 46 and 146 into asymmetric configurations in this modification. In this modified structure, it is only necessary to operate the release lever 50' alone in order to release the paired retractors simultaneously from their locked states.

Having now fully described the invention, it will be apparent to one of ordinary skill in the art that many changes and modifications can be made thereto without departing from the spirit or scope of the invention as set forth herein.

I claim:

1. A retractor permitting a forcible lock release, comprising:
   a base;
   a retractor shaft supported rotatably on the base and biased in a webbing winding direction;
   a latch plate and a ratchet wheel fixed on the shaft;
   a lock plate loose-fit on the shaft;
   a sensor arm supported on the lock plate, said sensor arm being displaceable between an engagement position where the sensor arm engages the ratchet wheel and a non-engagement position where the sensor arm is maintained out of engagement with the ratchet wheel;
   a pawl connected to the lock plate displaceably between a lock position where the pawl prevents rotation of the latch plate in a webbing releasing direction and a non-lock position where the pawl permits free rotation of the latch plate, said pawl being brought to the lock position when the sensor arm is at the engagement position and the lock plate is turned in the webbing releasing direction; and
   a lock releasing means for first causing the ratchet wheel to develop a phase difference in the webbing winding rotational direction relative to the sensor arm and then causing the lock plate to turn forcibly in the webbing winding direction, when operated.

2. The retractor as claimed in claim 1, wherein the lock releasing means comprises a manually operable lever supported turnably on the base, a release click operable responsive to a movement of the lever and engageable with the latch plate, and a release plate operable responsive to the movement of the lever and engageable first with the sensor arm and then with the lock plate.

3. The retractor as claimed in claim 2, wherein the release click and release plate are rotatably supported as unitary members on the base.

4. The retractor as claimed in claim 2, wherein the release plate defines a cam surface which guides the sensor arm to the non-engagement position when the lock plate is turned forcibly.

5. The retractor as claimed in claim 2, wherein the lever is biased by a spring alternatively into either one of a non-operated state where the lever has not been operated and an operated state where the lever has been operated.

6. The retractor as claimed in claim 1, wherein the lock plate defines interlocking teeth over a predetermined angle and the pawl defines lock teeth engageable with the interlocking teeth.

7. The retractor as claimed in claim 1, further comprising a means for sensing a speed change of at least a predetermined value applied to the base and then bringing the sensor arm to the engagement position.

8. The retractor as claimed in claim 1, further comprising a means for sensing a speed change of at least a predetermined value in a webbing releasing speed and then bringing the sensor arm to the engagement position.

9. A retractor permitting a forcible lock release, comprising:
   a base;
   a retractor shaft supported rotatably on the base and biased in a webbing winding direction;
   a latch plate and ratchet wheel fixed on the shaft;
   a lock plate loose-fit on the shaft;
   a sensor arm supported on the lock plate, said sensor arm being displaceable between an engagement position where the sensor arm engages the ratchet wheel and a non-engagement position where the sensor arm is maintained out of engagement from the ratchet wheel;
   a pawl connected to the lock plate displaceably between a lock position where the pawl prevents rotation of the latch plate in a webbing releasing direction and a non-lock position where the pawl permits free rotation of the latch plate, said pawl being brought to the lock position when the sensor arm is at the engagement position and the lock plate is turned in the webbing releasing direction;
   a first means for engaging the latch plate to cause the latch plate to turn in the webbing winding direction, when operated;
   a second means for contacting the sensor arm to develop a phase difference between the ratchet wheel and sensor arm while the latch plate is being turned by the first means; and a third means for engaging the lock plate subsequent to the development of the phase difference, so that a further rotation of the retractor shaft causes the lock plate to turn in the webbing winding direction.

10. The retractor as claimed in claim 9, wherein the first, second and third means are united together.

11. The retractor as claimed in claim 9, wherein the second means defines a cam surface for guiding the sensor arm to the non-engagement position subsequent to the development of the phase difference.

12. A retractor permitting a forcible lock release, comprising:
a pair of bases;
a pair of retractor shafts supported rotatably on the respective bases and biased respectively in webbing winding directions;
a pair of latch plates fixed on the respective shafts;
a pair of lock means displaceable between locking states where the lock means prevent rotations of the respective latch plates in webbing releasing directions and non-locking states where the lock means permit free rotations of the corresponding latch plates; and
a lock releasing means for simultaneously operating the pair of lock means upon an operation of the lock releasing means whereby the lock means are guided respectively from the locking states into the non-locking states, said lock releasing means comprising a manually operable lever supported turnably on at least one of the bases, a first releasing means operable by the lever to release one of the lock means, said first releasing means including an engagement portion at which the first releasing means undergoes an engagement with the lever, and a second releasing means engageable with the engagement portion to release the other lock means.

13. A retractor permitting a forcible lock release, comprising:
a base;
a retractor shaft supported rotatably on the base and biased in a webbing winding direction;
a latch plate and a ratchet wheel, both fixed on the shaft;
a pawl displaceable between a lock position where the pawl prevents rotation of the latch plate in a webbing releasing direction and a non-lock position where the pawl permits free rotation of the latch plate;
a means displaceable between a first state in which the displaceable means is connected at a connecting portion thereof to the ratchet wheel and a second state in which the displaceable means is not connected to the ratchet wheel, said displaceable means serving to guide the pawl to the lock position when the displaceable means is in the first state and the ratchet wheel is turned in the webbing releasing direction; and
a lock releasing means for first causing the ratchet wheel to develop a phase difference in the webbing winding rotational direction relative to the displaceable means and then causing the connecting portion of the displaceable means to move forcibly out of engagement with the ratchet wheel, when operated.

14. The retractor as claimed in claim 13, further comprising a means for sensing a speed change of at least a predetermined value applied to the base and the brining the displaceable means into the first state.

15. The retractor as claimed in claim 13, further comprising a means for sensing a speed change of at least a predetermined value in a webbing releasing speed and then bringing the displaceable means into the first state.

* * * * *